United States Patent [19]

Morimoto

[11] Patent Number: 4,729,871
[45] Date of Patent: Mar. 8, 1988

[54] PROCESS FOR PREPARING POROUS METAL PLATE

[75] Inventor: Toru Morimoto, Chiba, Japan

[73] Assignee: Hiroshi Kawaguchi, Tokyo, Japan

[21] Appl. No.: 833,375

[22] Filed: Feb. 26, 1986

[30] Foreign Application Priority Data

Jun. 21, 1985 [JP] Japan .................. 60-134241
Jun. 21, 1985 [JP] Japan .................. 60-134243
Jul. 24, 1985 [JP] Japan .................. 60-162053
Oct. 9, 1985 [JP] Japan .................. 60-225672

[51] Int. Cl.⁴ ............................................. B22F 7/00
[52] U.S. Cl. ............................................ 419/2; 419/4;
419/8; 419/9; 419/24; 419/36; 419/37;
148/105; 148/108; 428/549; 428/550; 428/557;
428/558
[58] Field of Search .......................... 419/2, 4, 24, 8, 9,
419/36, 37; 148/105, 108; 428/549, 550, 551, 558

[56] References Cited

U.S. PATENT DOCUMENTS 3,811,976  5/1974  Schlomer et al. ............... 419/24
4,049,428  9/1977  Elbert et al. ...................... 75/222
4,338,132  7/1982  Okamoto et al. ................ 75/226
4,576,872  3/1986  Ward ................................ 419/2

FOREIGN PATENT DOCUMENTS 0057848   8/1982  European Pat. Off. .
821690   10/1959  United Kingdom .
1212681  11/1970  United Kingdom .
1357214   6/1974  United Kingdom .
1383123   2/1975  United Kingdom .
2000990   1/1979  United Kingdom .

Primary Examiner—Stephen J. Lechert, Jr.
Attorney, Agent, or Firm—Young & Thompson

[57] ABSTRACT

A process for preparing a porous metal plate is disclosed which is adapted to use short metal fiber to prepare the plate. The process is capable of providing a porous metal plate which has increased bending strength and porosity, of which the porosity and thickness are controlled as desired and which has a wide and lengthy shape. The so-formed porous metal plate is capable of being extensively utilized, for example, not only as a filter and a sound absorption material but for a fuel cell, a catalyst and the like. It is formed by applying adhesive onto a surface of a substrate, and embedding short metal fibers in the adhesive. The composite thus formed is then pressed, to push over the short metal fibers, and the composite is then sintered. The substrate is a material which is capable of being burned out, or is a metal net, or is a release paper, so that the final plate will be porous throughout.

21 Claims, 16 Drawing Figures

PROCESS FOR PREPARING POROUS METAL PLATE

BACKGROUND OF THE INVENTION

1. Field of the Invention

This invention relates to a process for preparing a porous metal plate, and more particularly a process for making a porous metal plate of short metal fiber and metal particulate.

2. Description of the Prior Art

Recently, a porous metal material has been extensively used for a variety of applications. For example, a porous nickel material and a porous aluminum material are used for a fuel cell and a sound absorption material, respectively. Also, a porous stainless steel material is applied to a filter and used for catalyst and the like.

Although various kinds of porous metal materials as described above have been improved for satisfying such applications, it is still highly desired to develop techniques of preparing a porous metal material having porosity depending upon the applications.

A porous metal material which has been prepared according to a conventional process generally has porosity substantially varied depending upon the manufacturing process and/or metal to be used therefor.

More particularly, in general, sintered powder has porosity of 10-60% irrespective of metal to be used, whereas a metal fiber felt and sponge metal have that of 50-80% and 80-95%, respectively. Such porosity is varied depending upon the manufacturing process of porous metal. Also, some metal fails to provide a porous metal body other than a sintered body. Thus, it will be noted that the porosity of a porous metal material prepared is restricted within a limited range.

Further, conventional sintered metal has disadvantages that its bending strength is decreased to a degree sufficient to deteriorate workability and it is inconvenient to be handled, resulting in being restricted to use only at a limited place.

Furthermore, a porous metal material such as sintered powder, metal fiber felt, sponge metal or the like which is prepared according to a conventional process is substantially hard to be formed into a sheet-like shape having a large area. Also, it is not made to have a thickness above 10 mm and an area above 50 cm×50 cm. Thus, it will be noted that the shape and dimensions of porous metal each are limited to a narrow range.

SUMMARY OF THE INVENTION

The present invention has been made in view of the foregoing disadvantage of the prior art.

Accordingly, it is an object of the present invention to provide a process for preparing a porous metal plate which is capable of using short metal fiber and/or metal particulate to make a porous metal plate having increased bending strength and porosity.

It is another object of the present invention to provide a process for preparing a porous metal plate which is capable of making a porous metal plate having porosity controlled as desired.

It is a further object of the present invention to provide a process for preparing a porous metal plate which is capable of making a wide and lengthy porous metal plate of large dimensions.

In accordance with the present invention, there is provided a process for preparing a porous metal plate comprising the steps of applying adhesive onto at least one surface of a substrate; embedding short metal fiber and/or a combination of short metal fiber and metal particulate on said surface of said substrate with predetermined bulk density to form a composite; applying pressure to said surface of said composite having said short metal fiber embedded thereon to cause said short metal fiber to fall down; and sintering said composite.

Also, in accordance with the present invention, there is provided a process for preparing a porous metal plate comprising the steps of applying adhesive onto at least one surface of a substrate; embedding short metal fiber and/or a combination of short metal fiber and metal particulate on said surface of said substrate with predetermined bulk density to form a composite; superposing a plurality of said composites on one another; applying pressure to said superposed composites to cause said short metal fiber to fall down; and sintering said composites.

In the present invention, it is preferable that said short metal fiber and said combination of short metal fiber and metal particulate each are formed of at least one metal material selected from the group consisting of Al, bronze, Ni and stainless steel.

In the present invention, it is preferable that said adhesive is organic one and contains a melting-point depressant.

In the present invention, it is preferable that the embedding of said short metal fiber and/or said combination of short metal fiber and metal particulate on said surface of said substrate with predetermined bulk density is accomplished by at least one of spreading, the action of electrostatic field and the action of magnetic field.

Also, in the present invention, it is preferable that the superposition of said composites is carried out in a manner to oppose said surfaces of said composites each having said short metal fiber embedded thereon to one another.

In the present invention, it is preferable that said substrate is formed of a material which is capable of being burnt out.

In the present invention, it is preferable that said substrate comprises a metal net.

In the present invention, it is preferable that said substrate comprises a release paper, and the application of pressure to said composite is carried out after the removing of said release paper from said composite.

Furthermore, in the present invention, it is preferable that said substrate comprises a release paper, said release paper being removed after the application of pressure to said composite.

BRIEF DESCRIPTION OF THE DRAWINGS

These and other objects and many of the attendant advantages of the invention will be readily appreciated as the same becomes better understood by reference to the following detailed description when considered in connection with the accompanying drawings; wherein.

DETAILED DESCRIPTION OF THE INVENTION

Now, a process for preparing a porous metal plate according to the present invention will be described hereinafter.

Short metal fiber used in the present invention is also called fibrous metal in the art and indicates fine metal pieces formed into a suitable cross-sectional shape such as triangle, circle or the like and to have dimensions of about 20–100 $\mu$m in effective diameter and about 1–20 mm in length.

Such short metal fiber is typically prepared according to a pendant drop method (melt extraction method) or a chatter vibration method (cutting method). The former is to contact molten metal with a disc having a particular surface property and rotated with a high speed to extract short metal fibers and to solidify them. The latter is to subject a metal round bar to direct cutting operation to prepare short metal fiber.

The present invention is directed to the preparation of a porous metal plate using short metal fiber formed in such a manner as described above and has been made in view of the foregoing disadvantage of the prior art while taking notice of the fact found by the inventors that the use of short metal fiber provides a porous metal plate which has increased bending strength and porosity, of which porosity is controlled as desired and which has a wide and lengthy shape.

Further, in the present invention, it is convenient to use, if desired, metal particulate for the purpose of controlling the porosity and thickness of a porous metal plate to be prepared, as well as the short metal fiber.

Metal particulate used herein refers to metal particle or metal powder having a particle diameter of 5 $\mu$m–5 mm$\phi$. In the present invention, any metal particulate may be used so long as its particle diameter is within the above-described range.

Metal particle of a relatively large particle diameter may be conveniently prepared according to a method similar to that for short metal fiber.

Metal powder of a small particle diameter may be conveniently prepared according to an atomizing method in which molten metal is dropped into fluid of a high velocity or injected thereinto by means of a nozzle and powdered during the cooling by the fluid. The atomizing method is typically applied to the preparation of powder of Al, stainless steel, Ni, and alloys thereof. However, pure Ni powder prepared according to a carbonyl method is preferably used in the present invention.

Al and stainless steel particulates generally have an irregular shape and a mesh size extending from 40 mesh to 325 mesh.

When metal particulate is used with short metal fiber, the compositions of both materials are preferably substantially the same or similar to each other. For example, Al or Al alloy particulate is preferably used with respect to the use of short Al fiber. Also, when stainless steel is used for the short metal fiber, stainless steel of the same or similar stainless steel composition or Ni is preferably used for metal particulate. Further, Ni prepared according to the carbonyl method is preferably used as the metal particulate with respect to the use of short Ni fiber.

However, it is a matter of course that the present invention is never limited to the use of such materials as noted above. For example, when a porous metal plate prepared according to the present invention is to be used for a catalyst or the like, many different metals and alloys may be used for short metal fiber and metal particulate.

The short metal fiber and metal particulate described above may be formed of any metal and/or alloy (hereinafter merely referred to as "metal") depending upon the applications of a porous metal plate. For example, Ni, Al and stainless steel are used for the short metal fiber and particulate when a porous metal plate is applied to a fuel cell, a sound absorption material, and a filter material and a sound absorption material, respectively. Also, when it is applied to a catalyst and the like, a variety of metals and alloys may be used for the short metal fiber and metal particulate.

Generally speaking, in the method of the present invention, the short metal fiber is embedded on adhesive applied onto a substrate with predetermined bulk density and then, if desired, the metal particulate of the same or similar kind is spread on the metal fiber for the purpose of adjusting the porosity and/or thickness of a porous metal plate to be prepared, to thereby form a composite. One such composite or a plurality of the composites superposed together has applied thereto pressure and then sintered to provide a porous metal plate.

In the present invention, as detailedly described below, any material may be used for the substrate, so long as it permits adhesive to be held in the form of a plate-like shape thereon and short metal fiber and metal particulate to be embedded thereon with predetermined bulk density.

For example, a material burnt down or out in a subsequent sintering step such as a paper, a resin, a film, a cloth or the like is conveniently used for the substrate. Another material used for this purpose includes a material utilized as a layer which is capable of reinforcing a porous metal plate such as a net or a plate formed of stainless steel, or other metal or alloy, a net or plate formed of an inorganic material such as glass fiber, or the like. Further, a material which can be removed after drying and prior to sintering such as a release sheet may be used therefor.

The adhesive used in the present invention includes any organic and inorganic adhesive. Organic adhesive which is suitable for use in the present invention is selected from the group consisting of, for example, phenolic resin, resorcinol resin, furan resin, polyurethane resin, epoxy resin, silicone resin, polyvinyl acetate, polyvinyl alcohol, polyvinyl butyral, polyacrylic ester, butadiene-acrylonitrile rubber, neoprene and the like. In particular, polyvinyl acetate and polyvinyl alcohol are preferably used because they do not produce toxic gas during the sintering step.

Inorganic adhesive conveniently used for the adhesive includes water glass such as sodium silicate, potassium silicate and the like.

The adhesive preferably has fine powder of 15–70 $\mu$m in average particle diameter previously incorporated therein to serve as a melting-point depressant. The depressant is preferably selected from the group consisting of metal, alloy and a mixture of metal or alloy with a non-metallic material. The fine powder depressant acts to lower a sintering temperature of the short metal fiber and metal particulate to improve the sintering. The depressant is selectively used depending upon the short metal fiber and metal particulate. For example, Cu or Al-Cu is conveniently used for the depressant with respect to the use of fibrous Al for the short metal fiber and/or metal particulate. Carbonyl Ni (pure Ni prepared according to the carbonyl method), or Cu powder, or Ni-Cu powder is conveniently used when fibrous stainless steel is used therefor. Also, the use of carbonyl Ni powder as the depressant is convenient with respect to use of fibrous Ni. Further, Al-Cu or Cu-Sn powder may be used as the depressant when brass or bronze is used therefor.

The so-selected fine powder depressant added to the adhesive is dissolved or suspended in the adhesive, and adhered to each surface of the short metal fiber and metal particulate during the sintering step to increase a sintering temperature and simultaneously concentrated at a neck of the surface to promote the sintering.

Now, the practice of the present invention which is carried out using the above-described substrate, adhesive, short metal fiber and metal particulate will be illustrated hereinafter with reference to the drawings.

The following description will be made with respect to the use, as the substrate, of a paper which is capable of being burnt out or down during the sintering step, a stainless steel net which is capable of serving as a layer for reinforcing a porous metal plate to be prepared and a release paper which is capable of being removed prior to the sintering step.

However, it should be noted that the present invention is not limited to the use of such materials for the substrate, and any other materials may be conveniently used therefor so long as they exhibit substantially the same function.

(1) Use of paper as substrate:

The process is practiced in such a manner as shown in FIGS. 1a to 1f. More particularly, a substrate 1 comprising a paper which has a thickness of 1–50 μm and is capable of being burnt out during the sintering step is applied thereto adhesive 2 or a mixture of the adhesive 2 and a melting-point depressant 3, and then short metal fiber 4 is arranged on the paper 1 through the adhesive 2 with predetermined bulk density in a manner as described below, to thereby form a composite.

Subsequently, if required, metal particulate is spread over the short metal fiber in order to adjust the porosity and thickness of a porous metal plate to be prepared. The amount of spreading of the metal particulate per unit area, and the particle diameter and shape of the metal particulate are selectively determined depending upon the porosity and thickness to be adjusted.

The embedding of the short metal fiber and the spreading of the metal particulate on the substrate may be concurrently conducted. Alternatively, the spreading of the metal particulate may be carried out subsequent to the embedding of the short metal fiber.

Figure 1A:
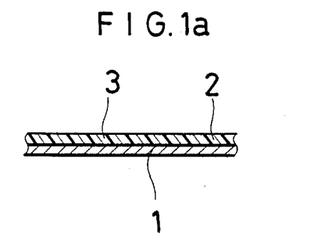
FIGS. 1a to 1f are diagrammatic views showing a process for preparing a porous metal plate according to the present invention in which a paper or the like is used as a substrate.
Figure 1B:
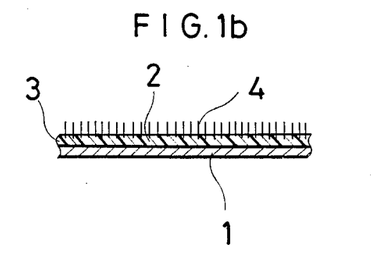
Figure 1C:
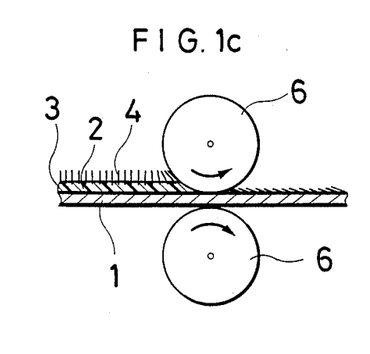
Figure 1D:
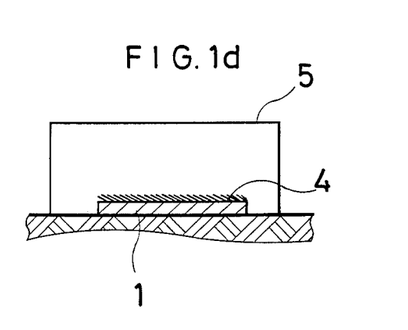

Then, after the drying of the adhesive 2, one such composition or a plurality of the compositions superposed together are guided between a pair of rolls 6 to be pressed, to thereby cause the short metal fibers to stick together. When two such composites are to be pressed or rolled, they are preferably superposed in a manner such that surfaces thereof each having the short metal fiber and metal particulate applied thereon are opposite to each other.

Figure 1E:
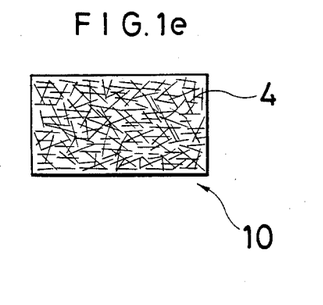

The pressed or rolled composites are then pre-annealed in a heating furnace 5 and then subjected to sintering for a predetermined period of time at a temperature determined depending upon the type of metal to be used. This causes the paper 1 and adhesive 2 to be burnt out and the melting-point depressant 3 and the short metal fiber 4 and/or metal particulate to be suitably sintered, to thereby prepare a porous metal plate 10 as shown in FIG. 1e.

Figure 1F:
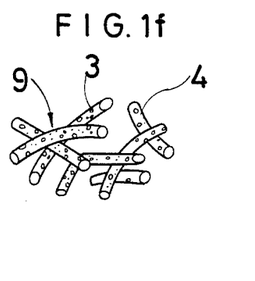

FIG. 1f is an enlarged schematical view showing the so-prepared porous metal plate 10. As seen in FIG. 1f, transition 9 concentratedly occurs in the short metal fiber 4 and the sintering of the melting-point depressant, short metal fiber 4 and the like is facilitated, because it is considerably subjected to cold working during the pressing or rolling step. Also, portions of the short metal fibers crossing one another are highly subjected to cold working, to thereby be activated by transition to a degree sufficient to facilitate the sintering. Sintering of the so-activated short metal fiber 4 and the like is effectively carried out in a short period of time to achieve satisfactory results, as compared with conventional sintering of metal powder.

(2) Use of stainless steel net as substrate

When a stainless steel net is used as the substrate, it remains as a reinforcing layer even after sintering to form a composite.

Figure 2A:
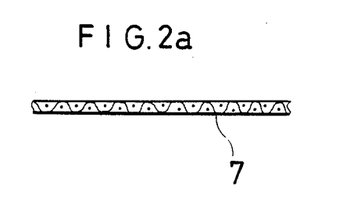
FIGS. 2a to 2e are diagrammatic views illustrating a process for preparing a porous metal plate according to the present invention in which a stainless steel net or the like is used as a substrate.
Figure 2B:
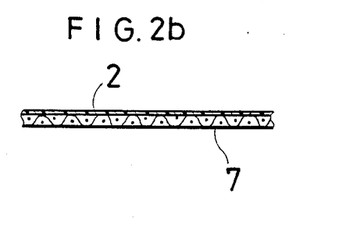

Adhesive 2, as shown in FIG. 2b, is applied in the form of a thin layer onto stainless steel net 7 shown in FIG. 2a. If necessary, a melting-point depressant is added to the adhesive 2. The adhesive 2 penetrates into the net 7 due to capillary phenomenon to be held therein. This effectively takes place when the net has a fine mesh size.

Figure 2C:
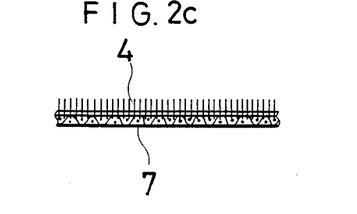

Then, short metal fiber 4 is embedded on the stainless steel net 7 having the adhesive coated thereon with predetermined bulk density according to procedures described below to form a composite, as shown in FIG. 2c. If required, metal particulate may be spread concurrently with the embedding of the fiber 4 or thereafter in order to adjust the porosity and thickness of a porous metal plate to be prepared.

Figure 2D:
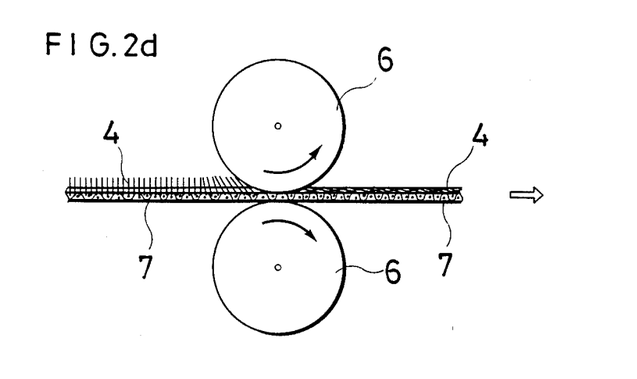

After the drying of the adhesive 2, one such composite or a plurality of the composites superposed on one another are guided between a pair of rolls 6 to be pressed or rolled, as shown in FIG. 2d, resulting in the embedded short metal fiber falling down.

Alternatively, the formation of the composite may be carried out by applying the adhesive 2, short metal fiber 4 and, if necessary, metal particulate onto both surfaces of the stainless steel net 7.

Figure 2E:
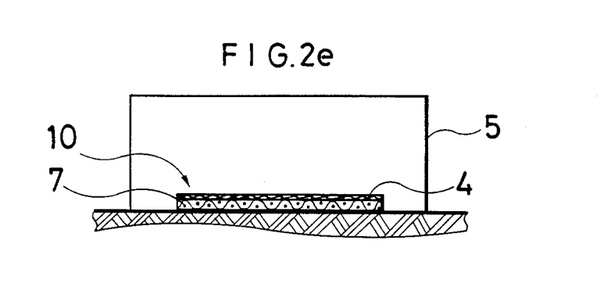

Subsequently, the so-formed composite is pre-annealed at a temperature of 200°–600° C. in a heating furnace 5 to cause the adhesive 2 to be vaporized and burnt out, as it stands or after it is cut into pieces of a predetermined length. Then, the composite is subjected to sintering at a predetermined temperature for a predetermined period of time to cause the short metal fiber 4 and stainless steel net 7 to be integrally sintered, leading to a porous metal plate 10.

In the porous metal plate 10 prepared due to sintering, the short metal fiber 4 is considerably subjected to cold working during the pressing or rolling step to a degree sufficient to cause the transition to be concentratedly occur. In particular, the portions of the fibers 4 crossing to one another are highly subjected to cold working sufficient to be activated due to transition. This facilitates more effective sintering of the fiber.

In the process of the present invention, the use of a stailess steel net as the substrate 7, particularly, when stainless steel is used for the short metal fiber 4 and metal particulate, causes the short metal fiber 4 and metal particulate to be effectively integrated with the net 7 due to sintering as well as the integration of the short metal fiber 4, so that the porous metal plate 10 prepared may have porosity of 60–80% sufficient to exhibit satisfied quality.

The arrangement of the short metal fiber 4 and metal particulate on both surfaces of the stainless steel net substrate 7 through the adhesive 2 provides a porous metal plate having porosity determined to be within a range of 40–60% depending upon the amount of the metal particulate, which can be used for a sound absorption material, a filter material and the like.

(3) Use of release sheet as substrate

A release sheet to be used may comprise a paper or craft paper of 1 μm or less in thickness having silicone resin, polyvinyl alcohol, paraffin, waxes, Teflon (polytetrafluoroethylene) dispersion or the like coated thereon. The release sheet is applied thereto adhesive and then short metal fiber is arranged thereon to form a composite. Thereafter, the adhesive is dried and then only the release sheet is removed from the composite.

The thickness of the release sheet used and the type of a release agent to be impregnated in the sheet are selectively determined depending upon the type of short metal fiber, metal particulate and adhesive to be used and the applications of a porous metal plate to be prepared.

A release sheet often exhibits water repellency depending upon the type of a release agent. Such a release sheet causes water glass, polyvinyl acetate, polyvinyl alcohol and the like to be formed into a droplet-like shape thereon when it is applied thereto, to thereby prevent the uniform coating. In order to avoid the problem, a surface-active agent such as a fluoro surface-active agent, alkali salt of higher fatty acid (household detergent) or the like is desirably added to these materials. In particularly, a nonionic surface-active agent mixture such as a mixture of modified silicone oil, a fluoro surface-active agent and an acetylene glycol surface-active agent is desirably used for this purpose. However, an anionic surface-active agent such as sulfonate, carbonate or the like and a cationic surface-active agent such as quaternary ammonium salt or the like are also conveniently used.

The coating of the adhesive on the release sheet may be carried out according to a suitable conventional method such as a roll coater method or the like. Although the thickness of the adhesive is varied depending upon the type of the adhesive and short metal fiber, and the like, it is generally within a range of about 0.5–50 μm.

Now, the practice of the present invention using a release paper will be further described with reference to FIG. 3.

Reference numeral 11 designates a release paper which is a release sheet formed, in a manner as described above. More particularly, it comprises a paper or craft paper of 0.1–1 mm in thickness having a release agent such as silicone resin or the like coated thereon as shown in FIG. 3a. Then, on the release paper 11 is coated adhesive 2 or a mixture of the adhesive and a melting-point depressant 3, as shown in FIG. 3b.

Figures 3A, 3B, 3C:
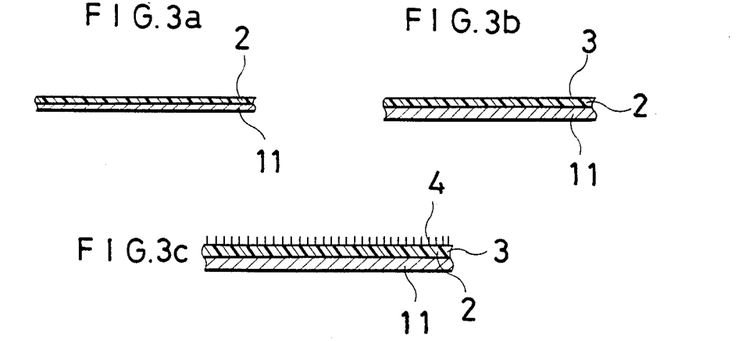
FIGS. 3a to 3e are diagrammatic views showing a process for preparing a porous metal plate according to the present invention in which a release paper or the like is used as a substrate.

Then, short metal fiber 4 is embedded on the release paper 11 through the adhesive 2 with predetermined bulk density to form a composite, as shown in FIG. 3c. If necessary, the spreading of metal particulate may be carried out simultaneously with or after the embedding of the short metal fiber 4 for the purpose of adjusting the porosity and thickness of a porous metal plate to be prepared.

Figure 3D:
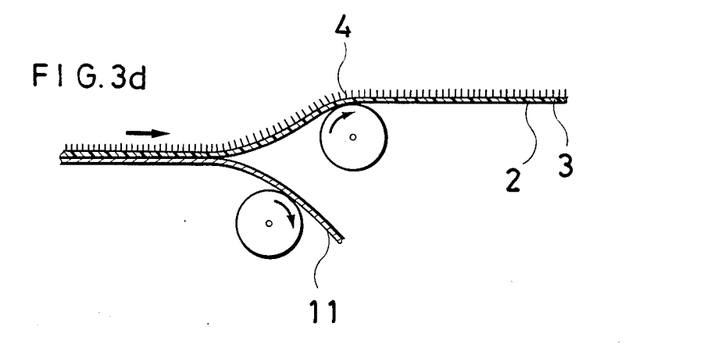

Subsequently, the adhesive 2 is dried and then the release paper 11 is removed from the composite, as shown in FIG. 3d.

Further, one such composite from which the release paper 11 was removed or a plurality of the composites superposed together are pressed or rolled to cause the short metal fiber 4 and the like to stick together. This is preferably conducted by means of a pair of rolls 6 as shown in FIG. 3e.

Alternatively, the removal of the release paper 11 from the composite may be made after the drying of the adhesive 2 followed by the pressing of the composite for effecting the falling-down of the short metal fiber 4.

When two or more such composites are superposed together to provide a multi-layer porous metal plate, the superposition is conveniently carried out in a manner such that surfaces of the composites each having the short metal fiber embedded thereon are opposite to one another.

Figure 3E:
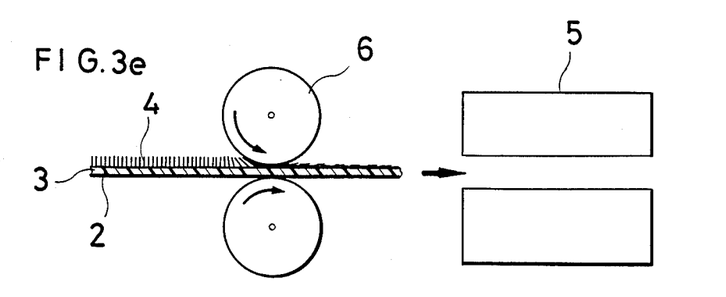

Thereafter, the composite is preferably subjected to pre-annealing in a sintering furnace 5 having a temperature of 200°–500° C., as shown in FIG. 3e. This results in organic adhesive being decomposed and vaporized.

Finally, the composite is subjected to sintering in the sintering furnace 5 shown in FIG. 3e.

In each of the above-described practices (1) to (3) of the present invention, the short metal fiber 4 and metal particulate are embedded on the substrate with predetermined bulk density. This indicates that the dimensions of the short metal fiber 4 such as length, diameter and the like and the bulk density are determined to allow a porous metal plate prepared after the embedding, pressing and sintering to have porosity and thickness sufficient to satisfy the desired applications.

In the present invention, this is effectively carried out according to an embedding method by spreading (spreading method), that utilizing a magnetic field (magnetic method) or that utilizing an electric field (electric method).

The spreading method is to uniformly spread or distribute the short metal fiber on the adhesive coated on the substrate. The bulk density of the short metal fiber is determined depending upon dimensions thereof, the feed speed of the substrate, the degree of scattering the fiber on the substrate, and the like.

The magnetic method is to subject the short metal fiber to a magnetic field to orientate it therein after the coating of the adhesive on the substrate. The electric method described below is not suitable for short metal fiber of high density. The magnetic method is conveniently used for short metal fiber formed of a material which has high density and is readily magnetized. This is particularly convenient to short metal fiber made of steel or ferritic stainless steel.

The electric method utilizes air which is a good insulating medium. More particularly, voltage is applied to plate electrodes placed in air to destroy the insulation of the air to form ionization, which results in short metal fiber being polarized. This causes one end of the fiber to be negative and the other end to be positive. Accordingly, when the substrate is positioned on, for example, the positive side, the negative end of the fiber is caused to travel to the substrate which is positive, so that the fiber may be embedded on the substrate. The distribution of the short metal fiber is controlled depending upon the dimensions of the fiber and/or the intensity of an electric field. Although conditions for the electric method are varied depending upon the dimensions and dielectric constant of the fiber, the method is preferably carried out under the conditions that voltage, current and the electrode interval are set at 10–50 kV, 0.1–0.2 mA and 3–20 cm, respectively.

The above-described fiber embedding methods are selectively used depending upon the type of the short metal fiber, the applications of a porous metal plate, and the like. Also, the methods may be used singly or in combination.

The pressing or rolling step in the present invention takes place for the purpose of fully contacting the short metal fiber and metal particulate together to effectively accomplish the subsequent sintering step.

Although pressure to be applied during the pressing or rolling step is varied depending upon the type of adhesive and short metal fiber used, and the like, it is generally set to be within a range of 1–5 ton/cm$^2$.

The pressure partially contributes the control of porosity and thickness of a porous metal plate to be prepared.

The so-rolled or pressed composite is then subjected to pre-annealing and subsequently sintered. Conditions for sintering the composite are varied upon the type of short metal fiber and metal particulate used, and the like. Table 1 shows optimum rolling or pressing and sintering conditions for various kinds of metals.

TABLE 1

Optimum Rolling Pressure and Sintering Conditions of Metal
(Sintering Time: 30–60 Min.)

| Short metal fiber and metal particulate | Pressure (ton/cm$^2$) | Sintering temperature (°C.) | Dew point (°C.) |
|---|---|---|---|
| Al | 1–2 | 600–655 | −40° C. or below |
| Bronze | 2–3 | 800–900 | −25° C. or below |
| Ni | 3–4 | 1000–1100 | −20° C. or below |
| SUS | 3–5 | 1050–1250 | −35° C. or below |

EXAMPLES

The present invention will be understood more readily with reference to the following examples; however, the examples are intended to illustrate the invention and are not to be construed to limit the scope of the invention.

EXAMPLE 1

A cellophane paper was used for a substrate and polyvinyl alcohol was used as adhesive. Also, short metal fiber and a melting-point depressant listed on Table 2 described below were used to form a composite according to the electric embedding method described above. The so-formed composite was rolled under the conditions shown in Table 2 and then subjected to pre-sintering in a furnace of 500° C. for thoroughly decomposing the adhesive. The electric embedding method was conducted under the conditions that service voltage, applied voltage and current were 100 V, 40 kV and 0.1 mA, respectively. Any transition and any variation of the metal fiber and melting-point depressant due to the pre-sintering were not observed. Then, the composite was subjected to sintering in a furnace having a dew point of −40° C. to prepare a porous metal plate. The cellophane paper or substrate was vaporized and burnt out during the sintering.

Then, a product test was conducted using samples of the so-prepared porous metal plate in connection with the following items:

(1) Determination of porosity

A flow resistance measuring apparatus was used for determining porosity of the metal plate.

(2) Determination of angle of cracking due to bending

A bending test was carried out in a manner to support a specimen on two supports so as to span them, put a press fitment of 10 mm in radius on the central portion of the specimen to generate cracking on the outer side of a bent portion of the specimen, and then measure the bending angle of the specimen at the time when the cracking occurred.

Results thereof were as shown in Table 2.

TABLE 2

(Use of Substrate Capable of Being Burnt Out)

| | Composite | | | | | | | | Conditions | | |
|---|---|---|---|---|---|---|---|---|---|---|---|
| | Short Metal Fiber | | Metal Particulate | | Adhesive | | | Number of Layers of | Embedding | Rolling Pressure | Sintering Temp. |
| Sample | Type | Size | Type | Size | Type | m.p. Depressant (Content) | Substrate | Composite | method | (ton/cm$^2$) | (°C.) |
| A1 | Ni | 60 μm × 3.2 mm | — | — | PVA | Carbonyl Ni (1:1) | Cellophane Paper (10 μm) | Single | Electric | 5 | 1080° C. × 30 min. |
| A2 | Al | 60 μm × 3.2 mm | — | — | PVA | — | Cellophane Paper (10 μm) | Single | Electric | 3 | 650° C. × 60 min. |
| A3 | SUS | 60 μm × 3.2 mm | — | — | PVA | — | Cellophane Paper (10 μm) | Single | Electric | 7 | 1200° C. × 60 min. |

| | | Product Test | | |
|---|---|---|---|---|
| Sample | Porosity (%) | Tensile strength (kg/cm$^2$) | Thickness (mm) | Cracking Angle (degree) |
| A1 | 80 | 400 | 0.6 | 130 |
| A2 | 80 | 200 | 0.3 | 150 |
| A3 | 80 | 500 | 0.5 | 120 |

*PVA: Polyvinyl alcohol

EXAMPLE 2

The example was carried out using materials and under conditions shown in Table 3.

As a substrate was a 30 mesh net formed of SUS 316 stainless steel of 0.15 mm in diameter, on at least one surface of which short metal fiber or a combination of short metal fiber and metal particulate was embedded by means of adhesive to prepare a composite. One the so-formed composite or a plurality of the composites superposed together were rolled with predetermined rolling pressure shown in Table 3 to cause the short metal fiber to fall down and then subjected to pre-sintering at a temperature of 500° C. for 10 minutes. Then, the pre-sintered composite or composites were sintered under conditions shown in Table 3 to prepare a porous metal plate (Samples B1–B13).

Results of a test carried out on each sample were as shown in Table 3.

TABLE 3
(Use of Stainless Steel Net As Substrate)

| | Composite | | | | | | | | |
|---|---|---|---|---|---|---|---|---|---|
| | Short Metal Fiber | | Metal Particulate | | Adhesive | | | Surfaces on which Fiber is Embedded | Number of Layers of Composite | Laminating Method |
| Sample | Type | Size | Type | Size | Type | m.p. Depressant (Content) | Substrate | | | |
| B1 | Al | 60 μm × 3.2 mm | — | — | PVA | — | SUS 316 30 mesh 0.15 mm φ | One | Single | |
| B2 | Al | 60 μm × 3.2 mm | — | — | PVA | — | SUS 316 30 mesh 0.15 mm φ | Both | Single | |
| B3 | Al | 40 μm × 4 mm | — | — | PVA | 325 mesh Al Powder (1:0.3) | SUS 316 30 mesh 0.15 mm φ | One | Single | |
| B4 | Al | 40 μm × 4 mm | — | — | PVA | 325 mesh Al Powder (1:0.3) | SUS 316 30 mesh 0.15 mm φ | Both | Single | |
| B5 | SUS 308 | 20 μm × 6 mm | — | — | PA | Carbonyl Ni Powder (1:1) | SUS 316 30 mesh 0.15 mm φ | One | Single | |
| B6 | Ni | 20 μm × 6 mm | — | — | ER | Carbonyl Ni Powder (1:1) | SUS 316 30 mesh 0.15 mm φ | Both | Single | |
| B7 | SUS 306 | 0.1 mm 5 mm | — | — | PVA | 325 mesh Carbonyl Ni (1:0.3) | SUS 316 30 mesh 0.15 mm φ | Both | Single | |
| B8 | SUS 308 | 40 μm × 6 mm | — | — | PVA | — | SUS 316 30 mesh 0.15 mm φ | One | Single | |
| B9 | SUS 308 | 140 μm × 15 mm | — | — | PVA | — | SUS 316 30 mesh 0.15 mm φ | One | Single | |
| B10 | SUS 308 | 40 μm × 6 mm | SUS 308 | Sphere 1 mm φ | PVA Ni Powder | Carbonyl 30 mesh (1:0.5) | SUS 316 0.15 mm φ | One | Single | |
| B11 | Cu | 60 μm × 4 mm | — | — | PVA | — | SUS 316 30 mesh 0.15 mm φ | Both | Single | |
| B12 | SUS 316 | 60 μm × 4 mm | SUS 316 | Sphere 1 mm φ | PVA | Carbonyl Ni Powder (1:0.5) | SUS 316 30 mesh 0.15 mm φ | One | Two | Metal Surfaces Are Opposite |
| B13 | Al | 60 μm × 3.2 mm | — | — | PVA | 325 mesh Al Powder | SUS 316 30 mesh 0.15 mm φ | Both | Two | Metal Surfaces Are Opposite |

| | Conditions | | | Product Test | | | |
|---|---|---|---|---|---|---|---|
| Sample | Embedding method | Rolling Pressure (ton/cm²) | Sintering Temp. (°C.) | Porosity (%) | Tensile strength (kg/cm²) | Thickness (mm) | Cracking Angle (degree) |
| B1 | Electric | 5 | 650° C. × 60 min. | 80 | 500 | 1.9 | 160 |
| B2 | Electric | 5 | 655° C. × 60 min. | 60 | 500 | 2.1 | 160 |
| B3 | Electric | 5 | 653° C. × 60 min. | 80 | 520 | 1.9 | 180 |
| B4 | Electric | 5 | 653° C. × 60 min. | 80 | 520 | 2.1 | 180 |
| B5 | Electric | 7 | 1180° C. × 60 min. | 80 | 980 | 0.5 | 160 |
| B6 | Electric | 6 | 1180° C. × 30 min. | 70 | 940 | 0.8 | 180 |
| B7 | Electric | 8 | 1200° C. × 30 min. | 90 | 810 | 1 | 160 |
| B8 | Spreading | 7 | 1200° C. × 30 min. | 80 | 980 | 0.5 | 160 |
| B9 | Magnetic | 8 | 1200° C. × | 85 | 980 | 1.5 | 120 |

TABLE 3-continued (Use of Stainless Steel Net As Substrate)

| | | | | | | | |
|---|---|---|---|---|---|---|---|
| B10 | Electric | 7 | 1200° C. × 60 min. | 80 | 980 | 0.5 | 160 |
| B11 | Electric | 6 | 950° C. × 60 min. | 80 | 700 | 1.1 | 180 |
| B12 | Electric | 7 | 1200° C. × 60 min. | 80 | 980 | 0.5 | 160 |
| B13 | Electric | 5 | 650° C. × 60 min. | 60 | 500 | 2.9 | 160 |

EXAMPLE 3

The example was carried out using materials and under conditions shown in Table 4.

A release paper of 0.15 mm in thickness which has a silicone release agent applied thereon was used as a substrate. Adhesives used each contained not only a melting-point depressant shown in Table 4 but a surface-active agent mixture of modified silicone oil, fluoro surface-active agent and acetylene glycol surface-active agent in amount of 0.8 wt. %. Each composite was formed by embedding short metal fiber and metal particulate on the substrate by means of the adhesive.

The electric embedding method was employed under the conditions that service voltage, applied voltage and current were set at 100 V, 40 kV and 0.1 mA, respectively.

Then, the release paper was removed from the composite. The so-formed composite was rolled in the form of a single or multilayer with rolling pressure shown in Table 4 and then subjected to pre-sintering. Finally, the composite was sintered under conditions shown in Table 4 to prepare a porous metal plate (Samples C1–C18).

Results of a test carried out each sample were as shown in Table 4.

TABLE 4
(Use of Release Sheet As Substrate)

| | Composite | | | | | | | | | Conditions | | | Product Test | | |
|---|---|---|---|---|---|---|---|---|---|---|---|---|---|---|---|
| | Short Metal Fiber | | Metal Particulate | | Adhesive | | Number of Layers of Composite | Laminating Method | Embedding method | Rolling Pressure (ton/cm²) | Sintering Temp. (°C.) | Porosity (%) | Tensile strength (kg/cm²) | Thickness (mm) | Cracking Angle (degree) |
| Sample | Type | Size | Type | Size | Type* | m.p. Depressant (Content) | | | | | | | | | |
| C1 | Al | 60 μm × 3.2 mm | — | — | PVAT | Al Powder (1:0.3) | Single | — | Electric | 3 | 653° C. × 60 min. | 70 | 200 | 0.3 | 170 |
| C2 | Al | 60 μm × 3.2 mm | — | — | PVA | 325 mesh Al Powder (1:0.3) | Two | Metal Surfaces Are Opposite | Electric | 3 | 653° C. × 60 min. | 50 | 200 | 0.6 | 170 |
| C3 | Ni | 60 μm × 3.2 mm | — | — | PVA | Al—Cu (70%) (1:1) | Single | — | Electric | 1 30 min. | 650° C. × 60 min. | 70 | 250 | 0.4 | 160 |
| C4 | Ni | 40 μm × 3.2 mm | Ni Powder | Irregular | PVA | — | Single | — | Electric | 5 | 1050° C. × 50 min. | 60 | 400 | 1.5 | 150 |
| C5 | Ni | 40 μm × 3.2 mm | — | — | PVA | 325 mesh Ni Powder (1:0.3) | Two | Metal Surfaces Are Opposite | Electric | 5 | 1050° C. × 60 min. | 60 | 400 | 2.8 | 150 |
| C6 | SUS 316 | 60 μm × 3.2 mm | — | — | PVA | — | Single | — | Electric | 7 | 1200° C. × 60 min. | 70 | 510 | 0.4 | 150 |
| C7 | SUS 316 | 40 μm × 3.2 mm | SUS 316 Powder | Sphere 1 mm φ | PVAT (1:1) | Ni (1:0.3) | Single | Are Opposite | Electric | 6 60 min. | 1200° C. × 60 min. | 70 | 600 | 1.5 | 160 |
| C8 | SUS 304 | 60 μm × 3.2 mm | — | — | PVA | 325 mesh Ni Powder (1:0.3) | Two | Metal Surfaces Are Opposite | Spreading | 7 | 1200° C. × 60 min. | 70 | 510 | 0.8 | 150 |
| C9 | SUS 304 | 140 μm × 3.2 mm 60 μm × 3.2 mm | — | — | PVA | — | Single | — | Magnetic | 7 | 1200° C. × 60 min. | 88 | 470 | 1.2 | 110 |
| C10 | Cu | 60 μm × 3.2 mm | — | — | PVA | — | Single | — | Electric | 5 | 950° C. × 60 min. | 58 | 410 | 0.5 | 160 |
| C11 | Al | 60 μm × 3.2 mm | — | — | PVA | Al—Cu (70%) (1:1) | Two | Metal Surfaces Are Opposite | Electric | 3 | 655° C. × 60 min. | 43 | 300 | 1.6 | 180 |
| C12 | SUS 304 | 140 μm × 14 mm 60 μm × 3.2 mm | — | — | PVA | 325 mesh Ni Powder (1:0.3) | Two | Laminated as They Stand | Magnetic | 7 | 1200° C. × 60 min. | 45 | 470 | 1.8 | 120 |
| C13 | SUS 316 | 40 μm × 3.2 mm | — | — | PVE | — | Single | — | Electric | 5 | 1200° C. × 40 min. | 70 | 700 | 0.8 | 170 |
| C14 | Al | 50 μm × 5 mm | — | — | PA | — | Single | — | Electric | 3 | 655° C. × 30 min. | 80 | 250 | 1 | 175 |

TABLE 4-continued
(Use of Release Sheet As Substrate)

| Sample | Composite Short Metal Fiber Type | Size | Metal Particulate Type | Size | Adhesive Type* | m.p. Depressant (Content) | Number of Layers of Composite | Laminating Method | Embedding method | Conditions Rolling Pressure (ion/cm²) | Sintering Temp. (°C.) | Porosity (%) | Product Test Tensile strength (kg/cm²) | Thickness (mm) | Cracking Angle (degree) |
|---|---|---|---|---|---|---|---|---|---|---|---|---|---|---|---|
| C15 | Ni | 30 μm × 2.5 mm | — | — | PVA | — | Single | — | Electric | 7 | 1100° C. × 1 hr | 65 | 400 | 0.8 | 170 |
| C16 | Bronze | 40 μm × 3.2 mm | — | — | PVA | Cu—So (70%) (1:1) | Single | — | Electric | 3 | 850° C. × 30 min. | 70 | 500 | 0.8 | 175 |
| C17 | SUS 430 | 100 μm × 15 mm | — | — | PVA | 325 mesh Ni Powder (1:1) | Single | — | Magnetic | 8 | 1150° C. × 1 hr | 85 | 600 | 1.2 | 170 |
| C18 | SUS 430 | 100 μm × 15 mm | — | — | PA | Cu Powder (1:1) | Single | — | Magnetic | 8 | 1150° C. × 1 hr | 85 | 600 | 1.2 | 170 |

*PVAT: Polyvinyl acetate, PVA: Polyvinyl alcohol, PVE: Polyvinyl ether, PA: Polyacrylate

REFERENCE

For reference, tests shown in Table 5 were conducted on samples of a porous metal plate prepared using materials and under conditions shown therein. Results thereof were as shown in Table 5.

TABLE 5

| | Materials | | | | Conditions | Product Test | | | |
|---|---|---|---|---|---|---|---|---|---|
| | Metal Particulate | | Sintering Assistant | | Sintering Temp. | Porosity | Tensile Strength | Thickness | Cracking Angle |
| | Type | Shape and Mesh Size | Type | Mesh Size | (°C.) | (%) | (kg/cm$^2$) | (mm) | (degree) |
| Reference 1 | Al | Sphere 30~130 | Al—Cu Powder 5% | 150~250 | 650° C. × 30 min. | 40 | 200 | 3 | 80 |
| Reference 2 | SUS | Sphere 100~160 | Ni Powder 5% | 300~350 | 1250° C. × 30 min. | 50 | 700 | 3 | 4 |
| Reference 3 | Ni | Sphere 300~350 | — | — | 1100° C. × 50 min. | 38 | 400 | 1 | 30 |

As can be seen from the foregoing, the process of the present invention can prepare a porous metal plate of any desired metal so long as it is capable of being formed into a fibrous shape. Also, the process of the present invention provides a porous metal plate which is capable of being readily subjected to bending, has good workability and high porosity of 40-90%, and is capable of exhibiting desired porosity. Thus, it will be noted that the process of the present invention can prepare a wide and lengthly porous metal plate of about 0.2-3 mm in thickness and about 1-100 cm in width which the prior art failed to provide.

Also, the present invention can continuously carry out the preparation of such a wide and lengthy porous metal plate.

The present invention, when a paper or the like is used as a substrate, eliminates the step of removing the substrate from a composite because it is vaporized and burnt out during the sintering step.

The present invention, when a stainless steel net or the like is used as a substrate, highly increases the mechanical strength of a porous metal plate because it significantly reinforces a composite during the sintering step. Also, the present invention allows short metal fiber and the like to be embedded on both surfaces of a stainless steel net substrate. This results in a porous metal plate suitable for use for a sound absorption material, a filter material and the like being provided.

When a release sheet or the like is used as a substrate in the present invention, it exhibits increased bending strength sufficient to permit a composite to be readily subjected to the pressing or rolling during the pressing or rolling step, so that a porous metal plate of which mechanical strength is highly improved may be provided. Also, the substrate is removed from the composite prior to the sintering step, accordingly, it is prevented from contaminating the final product.

Further, the present invention can use a plurality of composites in a manner to be laminated or superposed together, resulting in a porous metal plate having a thickness as large as 0.8-3 mm being readily provided.

While the invention has been described with a certain degree of particularity, obvious modifications and variations are possible in the light of the above teachings. It is therefore to be understood that within the scope of the appended claims, the invention may be practiced otherwise than as specifically described.

What is claimed is:

1. A process for preparing a porous metal plate comprising the steps of:
   applying adhesive onto at least one surface of a substrate;
   embedding short metal fibers by the action of at least one of an electrostatic field and a magnetic field, in said adhesive on said surface of said substrate with predetermined bulk densisty to form a composite;
   applying pressure to said composite to push over said short metal fibers; and
   sintering said composite.

2. A process as defined in claim 1, wherein said short metal fibers are formed of at least one metal selected from the group consisting of Al, bronze, Ni and stainless steel.

3. A process as defined in claim 1 wherein said adhesive is organic.

4. A process as defined in claim 1 wherein said adhesive contains a melting-point depressant.

5. A process as defined in claim 1 wherein said substrate is formed of a material which is capable of being burnt out.

6. A process as defined in claim 1 wherein said substrate comprises a metal net.

7. A process as defined in claim 1 wherein said substrate comprises a release paper.

8. A porous metal plate prepared according to the process defined in claim 1.

9. A process for preparing a porous metal plate comprising the steps of:
   applying adhesive onto at least one surface of a substrate;
   embedding short metal fibers by the action of at least one of an electrostatic field and a magnetic field, in said adhesive on said surface of said substrate with predetermined bulk density to form a composite;
   superposing a plurality of said composites on one another;
   applying pressure to said superposed composites to push over said short metal fibers; and
   sintering said composite.

10. A process as defined in claim 9 wherein the superposition of said composites is carried out in a manner to oppose to one another said surfaces of said composites each having said short metal fibers embedded thereon.

11. A process as defined in claim 9 wherein said short metal fibers are formed of at least one metal selected from the group consisting of Al. bronze, Ni and stainless steel.

12. A process as defined in claim 9 wherein said adhesive is organic.

13. A process as defined in claim 9 wherein said adhesive contains a melting-point depressant.

14. A process as defined in claim 9 wherein said substrate is formed of a material which is capable of being burnt out.

15. A process as defined in claim 9 wherein said substrate comprises a metal net.

16. A process as defined in claim 9 wherein said substrate comprises a release paper.

17. A porous metal plate prepared according to the process defined in claim 9.

18. A process as defined in claim 1, wherein said fibers are about 20-100 μm in diameter and about 1-20 mm in length.

19. A process as defined in claim 9, wherein said fibers are about 20-100 μm in diameter and about 1-20 mm in length.

20. A process as claimed in claim 1, in which said applying pressure is effected by rolling.

21. A process as claimed in claim 7, in which said applying pressure is effected by rolling.

* * * * *